US 6,661,853 B1

United States Patent
Agami et al.

(10) Patent No.: US 6,661,853 B1
(45) Date of Patent: Dec. 9, 2003

(54) METHOD AND APPARATUS FOR MAXIMAL-RATIO COMBINING OF RECEIVED FRAME DATA

(75) Inventors: Gregory Agami, Chicago, IL (US); Ron Rotstein, Arlington Heights, IL (US); Robert J. Corke, LaGrange, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/524,309

(22) Filed: Mar. 14, 2000

(51) Int. Cl.[7] .............................. H03D 1/00; H04L 27/06
(52) U.S. Cl. ........................................ 375/340; 375/267
(58) Field of Search ................................. 375/340, 346, 375/349, 316, 267, 347; 455/132

(56) References Cited

U.S. PATENT DOCUMENTS 6,094,427 A * 7/2000 Yi .............................. 370/331

6,389,066 B1 * 5/2002 Ejzak ......................... 375/224

* cited by examiner

*Primary Examiner*—Mohammad Ghayour
*Assistant Examiner*—Demetria Williams
(74) *Attorney, Agent, or Firm*—Lalita W. Pace (57) ABSTRACT

A method and apparatus for maximal-ratio combining of received frame data is provided. This technique increases the reliability of a communication network that includes multiple independent receivers. For example, when multiple independent receivers are not in agreement as to the received frame data (501, 502, 503), an embodiment of the invention provides a higher likelihood of correctly identifying the received frame data (501, 502, 503). A technique for determining a signal-to-noise ratio from a metric signal (504) derived from a decoder (701) in a receiver is provided. The signal-to-noise ratio may be characterized according to a polynomial estimate or stored in lookup table. The signal-to-noise ratio is used to apply a weighting (805) to "hard decision" data from the receiver to yield a weighted value (806). The weighted value is combined with weighted values from other receivers. The combined weighted values are applied to a data slicer (414) to yield received data (807).

22 Claims, 8 Drawing Sheets

*FIG.1*

— PRIOR ART —

— PRIOR ART —

METHOD AND APPARATUS FOR MAXIMAL-RATIO COMBINING OF RECEIVED FRAME DATA

FIELD OF THE INVENTION

The invention relates generally to communication systems and more specifically to a communication system including multiple independent receivers.

BACKGROUND OF THE INVENTION

Figure 1:
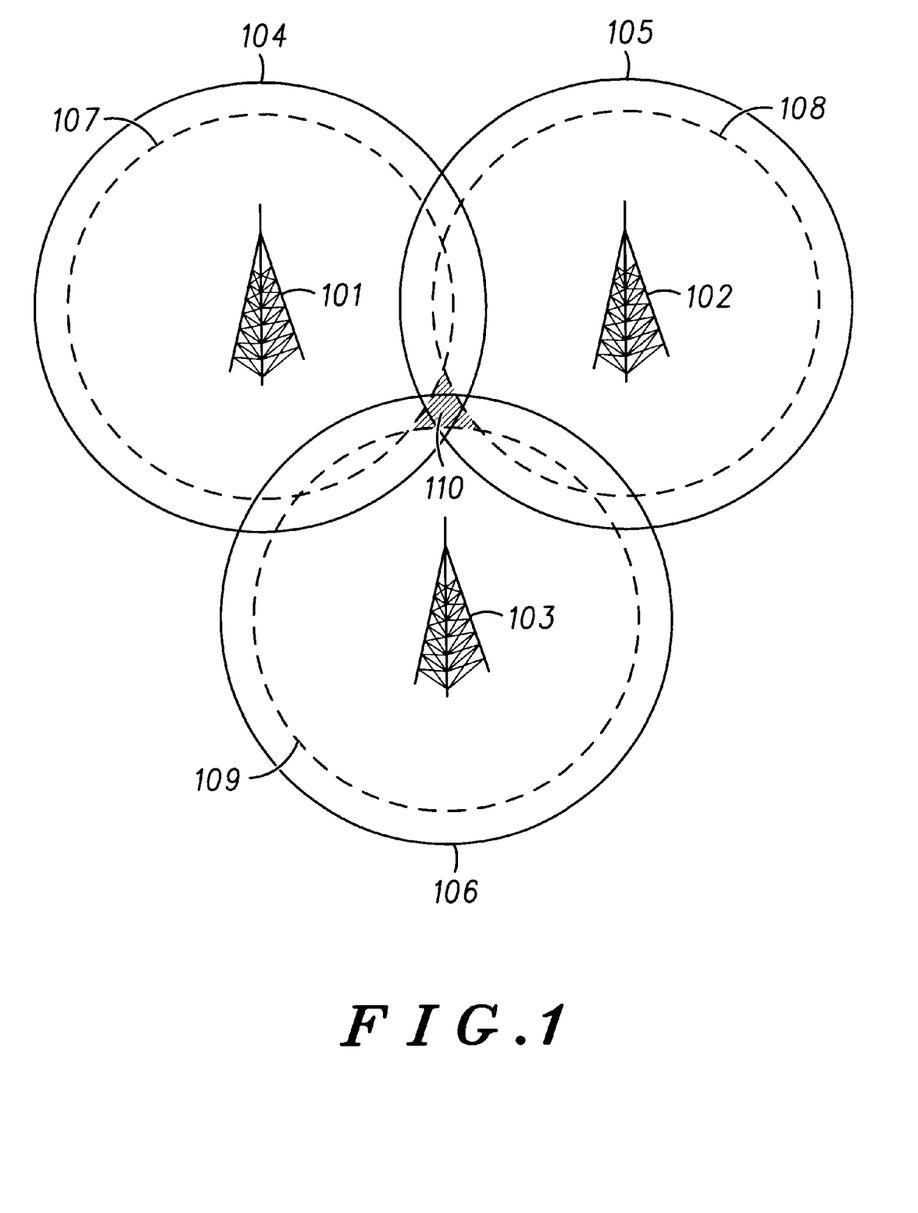
FIG. 1 is a diagram illustrating a portion of a prior art cellular communication network.

FIG. 1 is a diagram illustrating a portion of a prior art cellular communication network. The cellular communication network includes base stations 101, 102, and 103. Base stations 101, 102, and 103 provide areas of coverage 104, 105, and 106, respectively, for voice communications. Base stations 101, 102, and 103 are located relative to each other to ensure complete coverage, even providing overlapping coverage in fringe regions of these areas of coverage 104, 105, and 106, such as "soft handoff" region 110.

However, while significant noise can be tolerated for voice communications, high speed data communications are more sensitive to noise. Therefore, high speed data communications require a higher signal-to-noise ratio than voice communications. Since signals become weaker as the distance between antennas increases, signals to and from base stations 101, 102, and 103 become weaker as a mobile unit moves farther from the base station. As the signals become weaker, the signal-to-noise ratio decreases. Since high speed data communications require higher signal-to-noise ratios than voice communications, transmission output power levels are increased in order to maintain the same area of coverage for high speed data communications as compared with analog communications. However, limitations on transmission output power normally prevent high speed data channels from maintaining the same area of coverage. Therefore, areas of coverage 107, 108, and 109 for base stations 101, 102, and 103, respectively, for high speed data communications are smaller than areas of coverage 104, 105, and 106 for voice communications.

Since the locations of many base stations were chosen for the purposes of voice communications, base stations 101, 102, and 103 are sometimes too far apart to provide seamless coverage for high speed data communications. For example, none of areas of coverage 107, 108, or 109 for high speed data communications include region 111. Thus, a mobile unit located in region 111 would be denied service for high speed data communications. Thus, a technique is needed to increase the reliability of high speed data communications and to allow uninterrupted high speed data communications across multiple base stations.

Figure 6:
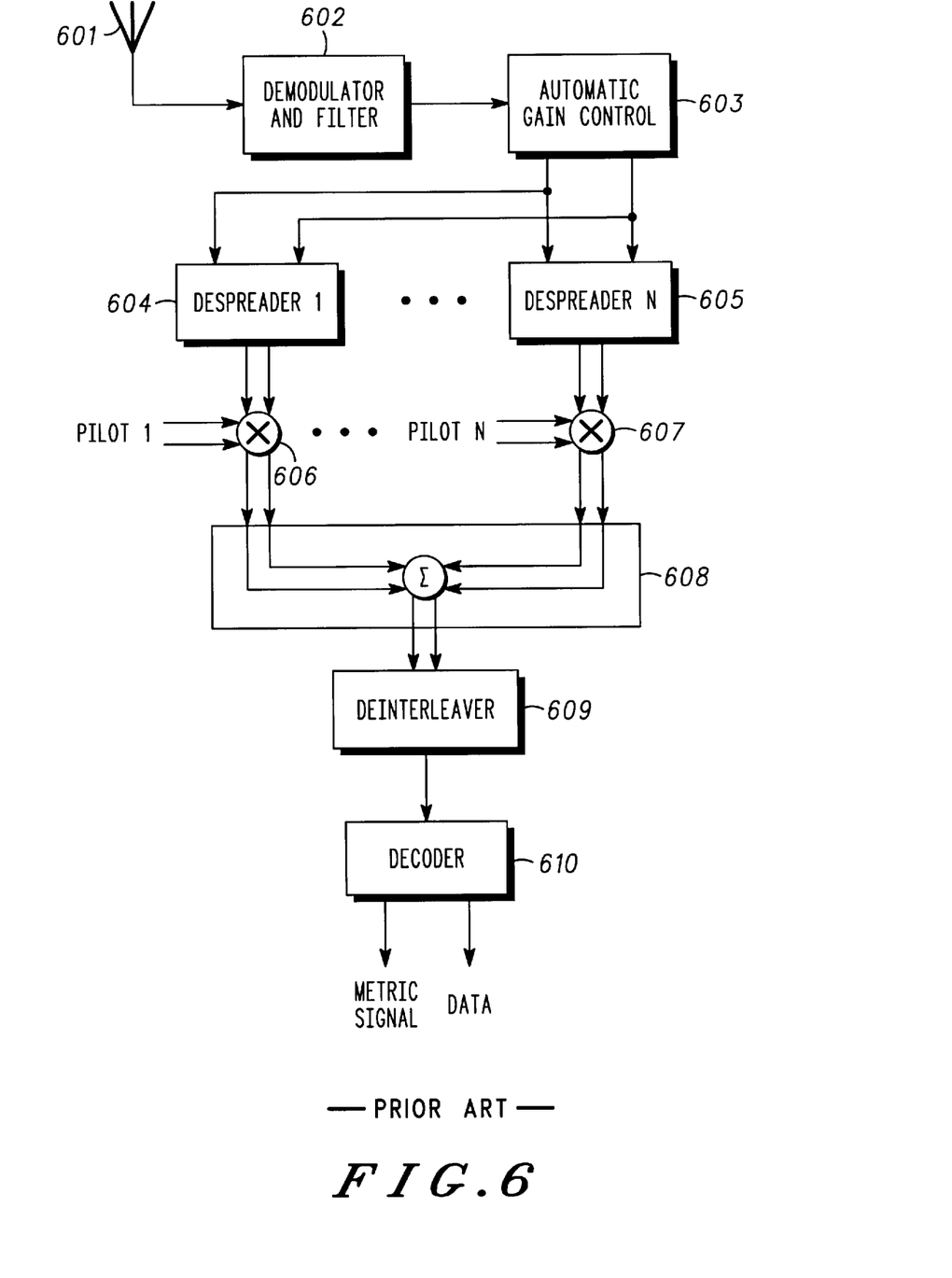
FIG. 6 is a block diagram illustrating a prior art receiver.

FIG. 6 is a block diagram illustrating a prior art receiver. A base station such as base stations 101, 102, and 103 includes such a receiver. The receiver includes antenna 601, demodulator and filter 602, automatic gain control (AGC) circuit 603, first despreader 604, nth despreader 605, channel correctors 606 and 607, deskewer/combiner 608, deinterleaver 609, and decoder 610. Antenna 601 is coupled to demodulator and filter 602. Demodulator and filter 602 is coupled to AGC circuit 603. AGC circuit 603 is coupled to a plurality of despreaders, illustrated by first despreader 604 and nth despreader 605. The despreaders are coupled to a plurality of channel correctors, illustrated by channel correctors 606 and 607. The channel correctors are coupled to deskewer/combiner 608. Deskewer/combiner 608 is coupled to deinterleaver 609. Deinterleaver 609 is coupled to decoder 610.

Decoder 610 provides a metric signal and data. Decoder 610 may be a Viterbi decoder. The metric signal provided by the decoder 610 is a correlation output of the most likely path chosen by the decoder from among many possible paths, which may be expressed in the form of a trellis diagram. This correlation output from the decoder of the most likely path chosen indicates the most likely data sequence based on the input to the decoder.

When a mobile unit is transitioning from an area of coverage of one base station to an area of coverage of another base station, the mobile unit operates in a "soft handoff" mode where the mobile unit communicates with more than one base station. For example, the mobile unit may communicate with three different base stations during a "soft handoff." A "soft handoff" differs from a "hard handoff" in that, for a "hard handoff," a mobile unit is in communication with only one base station at any given time, and the transition from one base station to another occurs at a specific moment in time. An example of a "soft handoff" process begins with a mobile unit communicating with a first base station within the area of coverage of the first base station. As the mobile unit moves toward a second base station, the mobile unit enters a region of "soft handoff" where the mobile unit is able to communicate with both the first base station and the second base station. If the mobile unit continues away from the first base station, the mobile unit leaves the region of "soft handoff" and remains in communication with the second base station.

The mobile unit transmits a reverse link signal to the base stations with which it communicates. To receive the reverse link signal transmitted by the mobile unit, each of these base stations attempts to decode the reverse link signal and sends its received frame data to a base station controller (BSC). Thus, the BSC receives the received frame data from each base station with which the mobile unit communicates.

Figure 2:
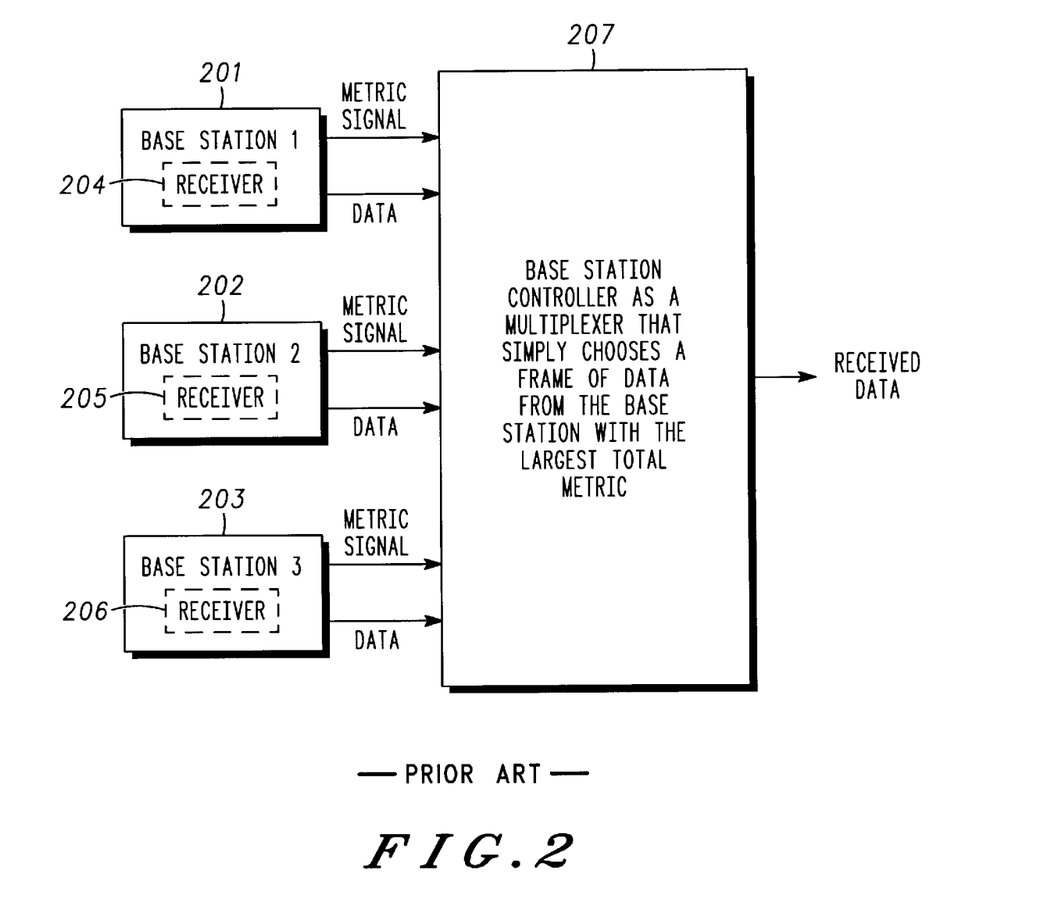
FIG. 2 is a block diagram illustrating a prior art technique for determining a received datum from a plurality of data from a plurality of independent receivers.

FIG. 2 is a block diagram illustrating a prior art technique for determining a received datum from a plurality of data from a plurality of independent receivers. Base stations 201, 202, and 203 include receivers 204, 205, and 206, respectively. Each of receivers 204, 205, and 206 provides a metric signal and data to a base station controller 207. The base station controller 207 of the prior art functions as a multiplexer that simply chooses a frame of data from the base station with the largest metric signal. The base stations 201, 202, and 203 provide "hard decision" data to the base station controller 207. The "hard decision" data represent a determination by the base station as to what the final received data are. The "hard decision" data are independent of the metric signal and are independent of the "hard decision" data provided to the base station controller 207 by other base stations. Since the "hard decision" data involve a decision being made at a base station as to what the final received data are, the base station controller is merely able to select "hard decision" data from among that provided by the base stations.

The presence of multiple independent receivers provides what is referred to as diversity in receiving the reverse link signal from the mobile unit. The type of diversity where the base station controller 207 simply chooses the frame of data from the base station with the largest metric signal is referred to as selection diversity.

The receivers 204, 205, and 206 are independent receivers in that they are geographically separate from each other and they provide data over relatively low bandwidth links to a common location. The limited bandwidth of the links imposes some constraints on the manner in which the data are communicated.

One problem with the techniques relates to the difficulty of determining a signal-to-noise ratio of the signal carrying the data. The signal-to-noise ratio affects the likelihood that the data will be correctly interpreted. However, no information about the signal-to-noise ratio is typically transmitted from a base station to the base station controller. Consequently, no provision is made at the base station to determine the signal-to-noise ratio.

Even if circuits were added to a base station to determine the signal-to-noise ratio, such circuit would increase the cost and complexity of each base station in which they were used. With cell sizes being reduced and the number of base stations increasing, such additional cost and complexity of each base station would greatly increase the overall system cost. Moreover, even if such circuits were added, additional bandwidth would be required to communicate the signal-to-noise ratio information. Additionally, base station controllers are typically not equipped to handle such signal-to-noise ratio information.

Figure 3:
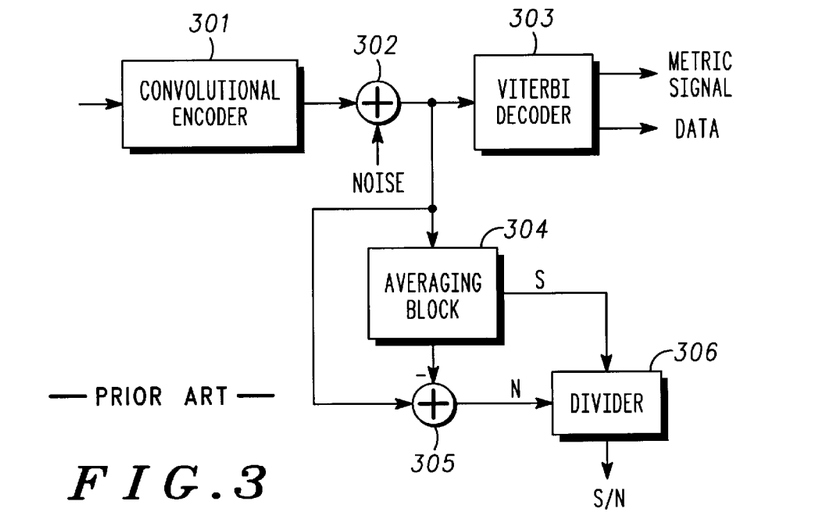
FIG. 3 is a block diagram illustrating a prior art technique for determining a signal-to-noise ratio of a data signal associated with a datum.

FIG. 3 is a block diagram illustrating a prior art technique for determining a signal-to-noise ratio of a data signal associated with a datum. Convolution encoder 301 provides a signal that is impaired by noise added during communication through a medium 302. Thus, the signal present at Viterbi decoder 303 is impaired by the noise.

To determine the signal-to-noise ratio of the signal present at the input of the Viterbi decoder 303, the signal is passed to an averaging block 304 and to an adder 305. The averaging block determines an average of the signal over a long period of time and applies this average to adder 305 as a negative input. This average tends to cancel out the effects of noise, thereby leaving only the signal.

The adder adds the negative of the signal to the combination of the signal plus the noise, thereby yielding a noise output representative of the noise only. The noise output from adder 305 and the signal output from the averaging block 304 are applied to a divider 306, which divides the signal by the noise, yielding the signal-to-noise ratio.

However, dividers, such as divider 306, are typically complex and would increase the cost of a receiver. Moreover, once the signal-to-noise ratio is determined, it would need to be communicated meaningfully to the base station controller in a manner not currently provided.

Another prior art technique calculates an average bit error rate over a large number (e.g., 10,000) frames and relates this bit error rate to the signal-to-noise ratio. However, this technique does not provide the signal-to-noise ratio on a frame-by-frame basis, thereby reducing its effectiveness.

Another prior art technique for achieving diversity involves equal gain combining. This technique is usually used with "soft decision" data since it does not take into account the metric signal. However, transmission of "soft decision" data is usually not practical because of the large bandwidth required to do so. If an attempt were made to use this technique with "hard decision" data, it would not provide a way of distinguishing data on the basis of its reliability since it would not include an information as to reliability. Thus, this technique is not practical for use with geographically-distributed independent receivers.

Thus, a technique is needed that can determine a signal-to-noise ratio value, effectively communicate it, and meaningfully use it to improve the performance of a communication network.

DETAILED DESCRIPTION OF A PREFERRED EMBODIMENT

A method and apparatus for maximal-ratio combining of received frame data is provided. This technique increases the reliability of a communication network that includes multiple independent receivers. For example, when multiple independent receivers are not in agreement as to the received frame data, an embodiment of the invention provides a higher likelihood of correctly identifying the received frame data.

The invention is especially useful with communication networks communicating digital high speed data signals. As digital high speed data signals are generally less tolerant of noise than digital voice signals, the ability of the invention to increase the likelihood of correctly identifying the received frame data helps ensure accurate communication of digital high speed data signals. By increasing the likelihood of correctly identifying the received frame data, the invention extends the range between a base station and a mobile unit, thereby helping to ensure continuous coverage across areas covered by multiple base stations.

An embodiment of the invention provides maximal-ratio combining at the base station controller of data from multiple independent receivers in multiple base stations. This technique provides improved performance over selection diversity when a mobile unit is in "soft handoff" between different base stations. While a traditional "hard handoff" would require that the mobile unit be designated to communicate with a particular base station or use specific frequency or code parameters, the "soft handoff" technique allows more than one base station to attempt to communicate with the mobile unit. The actual received frame data is determined based on the received signals obtained from the receivers at the several base stations. By combining information of varying quality received from several base stations, composite information of relatively higher quality may be obtained. While a mobile unit moves relative to the base stations, the base stations in communication with the mobile unit may change. Thus, information combined from a new set of base stations may replace previous information combined from an old set of base stations. As this process occurs, it is not necessary to designate the mobile unit to communicate exclusively with a single base station.

Alternatively, the location of a mobile unit relative to a particular base station may be determined either by passing location information from the mobile unit to the base station or by monitoring the quality of the information communicated between the mobile unit and that particular base station. As the mobile unit approaches a limit of coverage for a first base station, a "soft handoff" procedure may be used to allow the mobile unit to transition from the first base station to another base station.

It is during the "soft handoff" that the signal providing data from the mobile unit is at its weakest. Thus, the invention provides increased performance when it is most needed. The maximal-ratio combining technique according to an embodiment of the invention provides a 1 dB gain over selection diversity techniques of the prior art. The 1 dB gain is also obtained for the bit error rate. Thus, for equal signal-to-noise ratio values at each receiver, maximal-ratio combining according to an embodiment of the invention provides a significant performance gain without the need for increased bandwidth and without the need for complex changes to the receivers.

It should be understood that it is not possible to illustrate every possible implementation of the invention. Thus, while the invention is described with respect to specific embodiments, it should be understood that one of ordinary skill in the art could practice the invention using variations of the embodiments set forth herein or in a different form than that shown.

Figure 4:
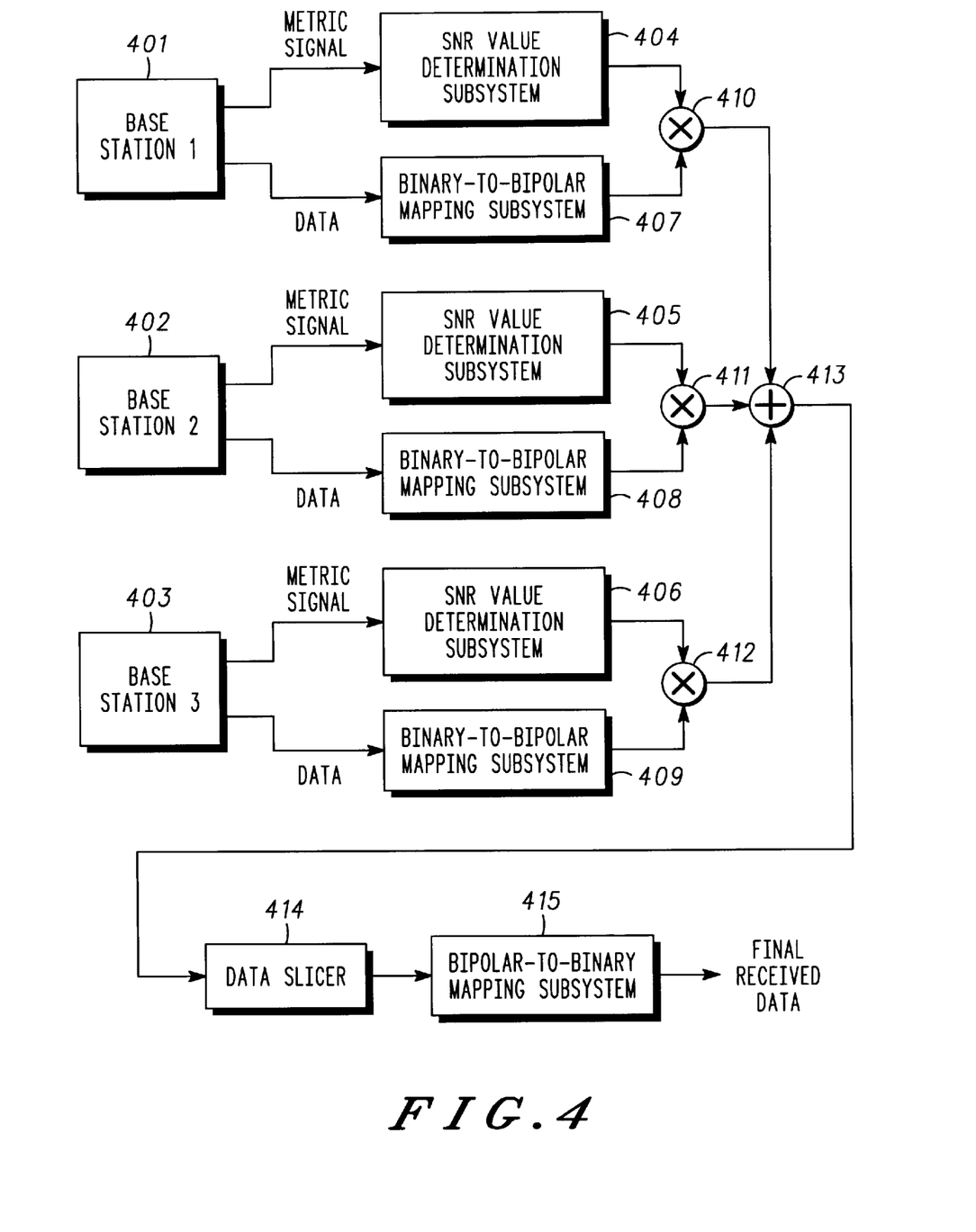
FIG. 4 is block diagram illustrating a system for determining a received datum from a plurality of data from a plurality of independent receivers according to an embodiment of the invention.

FIG. 4 is block diagram illustrating a system for determining a received datum from a plurality of data from a plurality of independent receivers according to an embodiment of the invention. Base stations 401, 402, and 403 provide metric signals to signal-to-noise ratio (SNR) value determination subsystems 404, 405, and 406, respectively. The signal-to-noise ratio value determination subsystems 404, 405, and 406 are operatively coupled to receivers of the plurality of independent receivers in base stations 401, 402, and 403, respectively, to determine signal-to-noise ratio values for each of the receivers. Base stations 401, 402, and 403 provide data to binary-to-bipolar mapping subsystems 407, 408, and 409, respectively.

SNR value determination subsystems 404, 405, and 406 determine an SNR value based on the metric signal without the need for additional circuits in base stations 401, 402, or 403 and without the need for additional communication paths from base stations 401, 402, or 403. Thus, the SNR value determination subsystems 404, 405, and 406 avoid the disadvantages of the prior art.

Binary-to-bipolar mapping subsystems 407, 408, and 409 are operatively coupled to the receivers of base stations 401, 402, and 403 to map the data from the receivers in base stations 401, 402, and 403, respectively, from binary to bipolar form to yield representations of the data. Thus, a binary zero (0) is mapped to a bipolar one (1), and a binary one (1) is mapped to a bipolar negative one (−1).

The SNR value and the bipolar-mapped data are applied to multipliers 410, 411, and 412 for base stations 401, 402, and 403, respectively. The multipliers 410, 411, and 412 are operatively coupled to the signal-to-noise ratio value determination subsystems 404, 405, and 406 to multiply the signal-to-noise ratio values by the representations of a data to provide a weighted values at the outputs of multipliers 410, 411, and 412. The multipliers 410, 411, and 412 may be implemented by using the datum from the receiver to determine whether to change the sign of the signal-to-noise ratio value. Other logical techniques for converting a value to its negative may also be applied to the signal-to-noise ratio value if the datum is a 1 mapped to a −1 in the binary-to-bipolar mapping process. The weighted values are applied to an adder 413 that is operatively coupled to multipliers 410, 411, and 412 to combine the weighted values to provide a combined weighted value.

The system further includes a data slicer 414 operatively coupled to the adder to determine received data based on the combined weighted values. The received data determined by the data slicer 414 is passed to a bipolar-to-binary mapping subsystem 415 that is coupled to the data slicer 414 to map the received data from bipolar to binary form to provide final received data.

The signal-to-noise ratio value determination subsystems 404, 405, and 406 may be practiced to include a lookup table memory device to provide the signal-to-noise ratio value for each signal-to-noise ratio value determination subsystem 404, 405, and 406 from a plurality of signal-to-noise ratio values. The signal-to-noise value determination subsystems 404, 405, and 406 may include a relationship memory device that stores an average metric relationship, for example a mathematical relationship between an average metric value and an SNR value. A processor is operatively coupled to the relationship memory device to receive the average metric relationship stored in the relationship memory device. A metric signal to signal-to-noise-ratio value converter is operatively coupled to the receivers to receive the metric signals. The metric signal to signal-to-noise ratio value converter is also coupled to the processor. The processor provides to the metric signal to signal-to-noise ratio value converter a signal-to-noise ratio value corresponding to the average metric value. The metric signal to signal-to-noise ratio value converter stores the signal-to-noise ratio value addressable by the average metric value.

While signal-to-noise ratio value determination subsystems 404, 405, and 106 are illustrated as separate subsystems, it should be understood that they need not be separate. For example, one signal-to-noise ratio value determination subsystem may be shared in time between the multiple base stations 401, 402 and 403 so as to determine the signal-to-noise ratio value for each base station. Likewise, binary-to-bipolar mapping subsystems 407, 408, and 409 may be implemented as a single subsystem serving all of the base stations 401, 402, and 403. Also, multipliers 410, 411, and 412 may be implemented as a single multiplier capable of performing the functions of multipliers 410, 411, and 412.

While the signal-to-noise value determination subsystems 404, 405, and 406, the binary-to-bipolar mapping subsystems 407, 408, and 409, the multipliers 410, 411, and 412, the adder 413, the data slicer 414, and the bipolar-to-binary mapping subsystem 415 are illustrated as separate and distinct components, it should be understood that the functions of these separate components may be combined into fewer components or even a single component. Likewise, these functions may be implemented using programmable components, such as programmable logic elements or a processor, for example a digital signal processor (DSP) using program code to implement the functions described.

Figure 5:
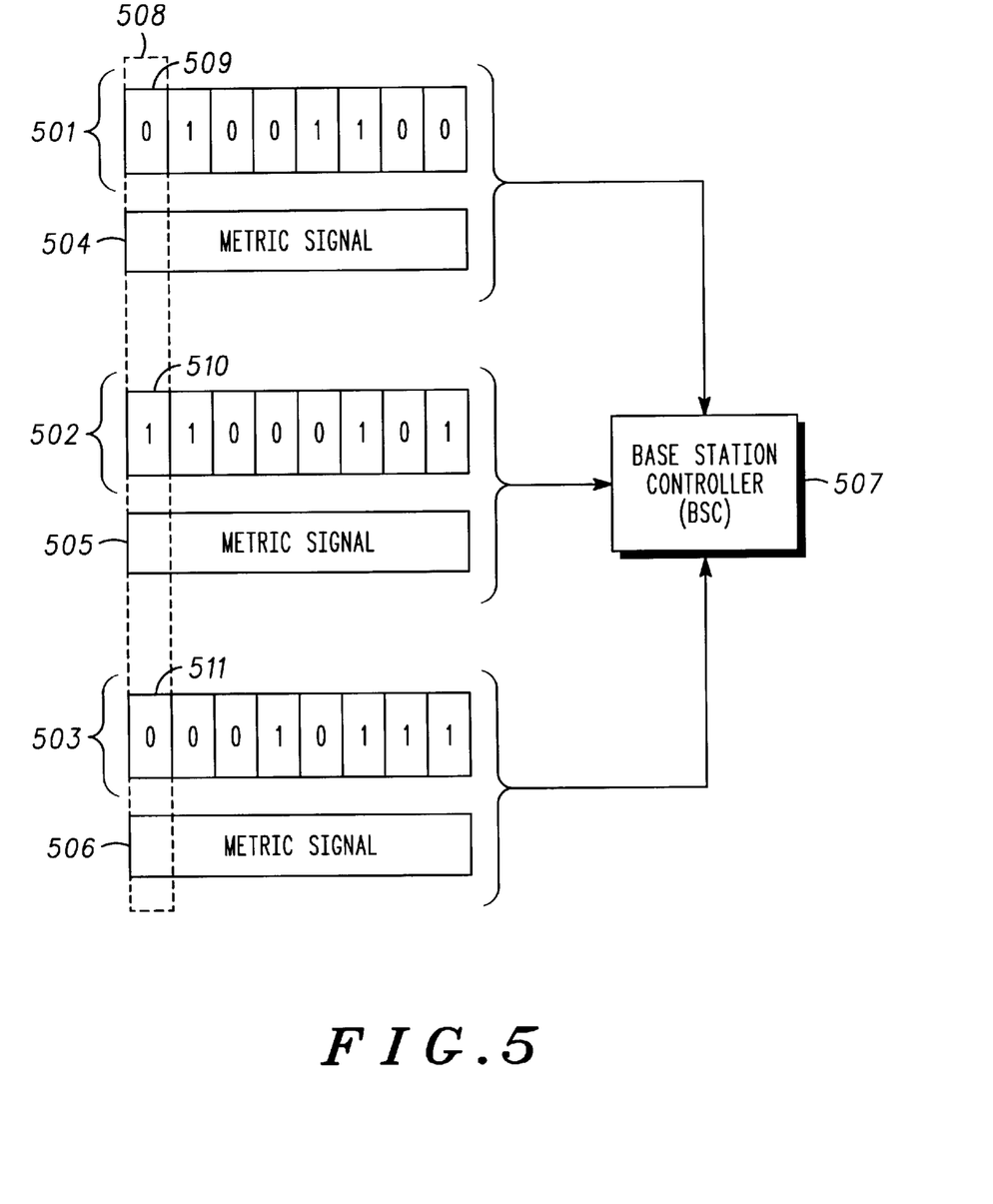
FIG. 5 is a diagram illustrating a technique according to an embodiment of the invention.

FIG. 5 is a diagram illustrating a technique according to an embodiment of the invention. Data 501 including a first datum 509 from a first receiver is provided to a base station controller (BSC) 507. A metric signal 504 from the first receiver is also provided to the BSC 507. Data 502 including a second datum 510 from the second receiver, along with a metric signal 505, is provided to the BSC 507. Data 503 including a third datum 511 from a third receiver, along with a metric signal 506, is provided to the BSC 507.

The metric signal 504 may be valid for an entire frame of data 501. Thus, the BSC 507 applies the metric signal 504 to the first datum 508 and each subsequent datum to produce a weighted value for each datum in the frame of data 501. Likewise, the BSC 507 produces weighted values for each datum in the frame of data 502 from the second receiver and for each datum in the frame of data 503 from the third receiver.

There are a variety of methods of estimating the signal-to-noise ratio of a received signal. One method involves relating the metric signal received from the decoder of a receiver to the parameter $E_b/N_0$, where $E_b$ is the energy per bit, and $N_0$ is the noise spectral density. Assuming that the AGC circuit of a receiver adequately scales a signal carrying data to use its full dynamic range, an average metric signal has both an upper bound and a lower bound. If the signal carrying data has no noise component, then the metric signal will simply be the maximum branch metric of the decoder multiplied by the number of decoded bits. For a fundamental channel operating at 9600 bps, with a total number of bits in a frame of 192, and an encoder rate of 1/3, the maximum average metric signal is 576 if the signal carrying the data is normalized to the interval [−1,1].

However, if the signal is dominated by noise, then all surviving paths through the trellis diagram will have similar path metrics. Because non-survivors at each stage of the trellis are dropped, the path metric will develop a positive bias. Thus, the average metric signal will have a positive lower bound, determined by the number of bits in a frame.

The average metric signal as a function of $E_b/N_0$ can be calculated mathematically. If it is assumed that all zeroes are transmitted so that the decoder input is $$r_k = \sqrt{E} + \eta_k \quad k = 0, 1, \ldots, B/R - 1$$

where B is the number of encoder input bits (i.e. the path length), R is the encoder rate, and $\rho_k$ are zero mean independent Gaussian noise samples.

Then the metric at the terminal stage for state zero resulting from a path differing from the all zero's path in d code symbols (i.e. weight d) is $M_0$=metric assuming all 0's sent $$M_0 = \left(\frac{B}{R} - d\right)\sqrt{E} - d\sqrt{E} + \zeta_d$$

where d is a weight, E is an energy at a decoder input of a noisefree symbol, $$\zeta_d = \sum_{k=0}^{B/R-1} \eta_k c_{kd},$$

and $c_{kd} = \pm 1$ is the $k^{th}$ encoder output hypothesis of the weight d path of the trellis. Since $\bar{\zeta}=0$, the mean value of the total metric of state 0 taking a path of weight d is $$E[M_0 \mid d] = \left(\frac{B}{R} - 2d\right)\sqrt{E}$$

Due to the decoder constraint, the metric corresponding to the "winning" path is the maximum total metric. Averaging over all paths, for a given code weight distribution, $n_d$, and $\gamma_b = E_b/N_0$, the average maximum total metric is $$E[M_{\max}] = (1 - P_e)E[M_0 \mid path_0] + \sum_i P[path_d]E[M_0 \mid d] \quad \text{Eq. 1}$$

$$= \frac{B}{R}\sqrt{E}(1 - P_e) + \sum_d \left(\frac{B}{R} - 2d\right)\sqrt{E}\, P[path_d]$$

where $P[path_d] = n_d Q[\sqrt{2\gamma_d Rd}]$ is the probability of the decoder choosing a weight d path, $n_d$ is the number of weight d codes, $$Q(t) = \frac{1}{\sqrt{2\pi}} \int^\infty e^{-\frac{y^2}{2}} dy$$

and, $$P_e = \sum_{d \neq 0} n_d Q[\sqrt{2\gamma_b Rd}] \quad \text{Eq. 2}$$

is the probability of error.

These equations can be calculated iteratively for different values to define a curve expressing $E_b/N_0$ as a function of a metric signal. The curve can be approximated by a polynomial estimate or specific points on the curve can be stored in a lookup table.

As an example, the relationship between the average metric signal and the signal-to-noise ratio for 192-bit frame, an encoder rate of 1/3, and a constraint length of K=9 can be considered. The average metric signal has a lower bound of around 100 and an upper bound of 576. The total metric begins moving away from its lower bound at around 0 dB. In order to estimate the $E_b/N_0$, the inverse function is used to map metric values to $E_b/N_0$ values and to generate a lookup table or a polynomial estimate.

While $E_b/N_0$ is one example of a parameter that may be used as an expression of a signal-to-noise ratio, it should be understood that any parameter that exhibits a mathematical relationship or empirical correspondence to a signal-to-noise ratio may be used in place of an actual signal-to-noise ratio.

Figure 7:
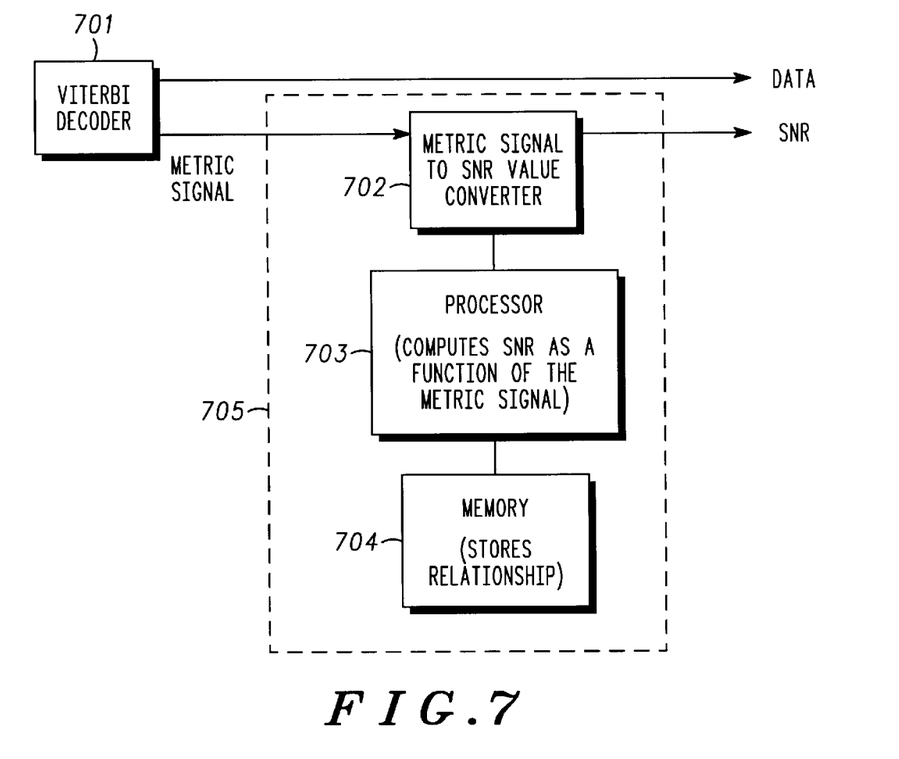
FIG. 7 is a block diagram illustrating apparatus for converting a metric signal to a signal-to-noise ratio value according to an embodiment of the invention.

FIG. 7 is a block diagram illustrating apparatus for converting a metric signal to a signal-to-noise ratio value according to an embodiment of the invention. The signal-to-noise ratio value is useful to select a datum from a plurality of data from a plurality of independent receivers, where the signal-to-noise ratio value corresponds to the datum.

The apparatus includes a relationship memory device 704 used to store an average metric relationship. The average metric relationship relates an average metric signal to a signal-to-noise ratio value. A processor 703 is operatively coupled to the relationship memory device 704 to receive the average metric relationship stored in the relationship memory device. The processor 703 uses the average metric relationship to calculate specific values of the average metric signal and corresponding signal-to-noise ratio values.

A metric signal to signal-to-noise-ratio value converter 702 is operatively coupled to a decoder 701 of a first receiver of the plurality of independent receivers to receive a first metric signal. The metric signal to signal-to-noise ratio value converter 702 is also coupled to the processor 703. The processor 703 provides to the metric signal to signal-to-noise ratio value converter 702 a first signal-to-noise ratio value corresponding to a first average metric value.

The metric signal to signal-to-noise ratio value converter 702 stores the first signal-to-noise ratio value addressable by the first average metric value. Thus, by specifying a first average metric value, the metric signal to signal-to-noise ratio value converter 702 provides the signal-to-noise ratio value that corresponds to that first average metric value. Together, the metric signal to signal-to-noise ratio value converter 702, the processor 703, and the relationship memory device 704 form an example of a SNR value determination subsystem.

The average metric relationship is of a form $$\sqrt{E} \sum_{i=0}^{B/R} P[i]\left(\frac{B}{R} - 2i\right),$$

where

E is an energy at a decoder input of a noisefree symbol,
B is a number of encoder input bits,
R is an encoder rate, $$P[i] = \binom{B/R}{i} p^i (1-p)^{B/R-i}$$

p is a channel bit error probability,
$E_b$ is an energy per bit, and
$N_0$ is a noise spectral density.

While the components of FIG. 7 are illustrated as being separate, it should be understood that they need not be separate. For example, it should be understood that the functions of these separate components may be combined into fewer components or even a single component. Likewise, these functions may be implemented using programmable components, such as programmable logic elements or a processor, for example a digital signal processor (DSP) using program code to implement the functions described.

Figure 8:
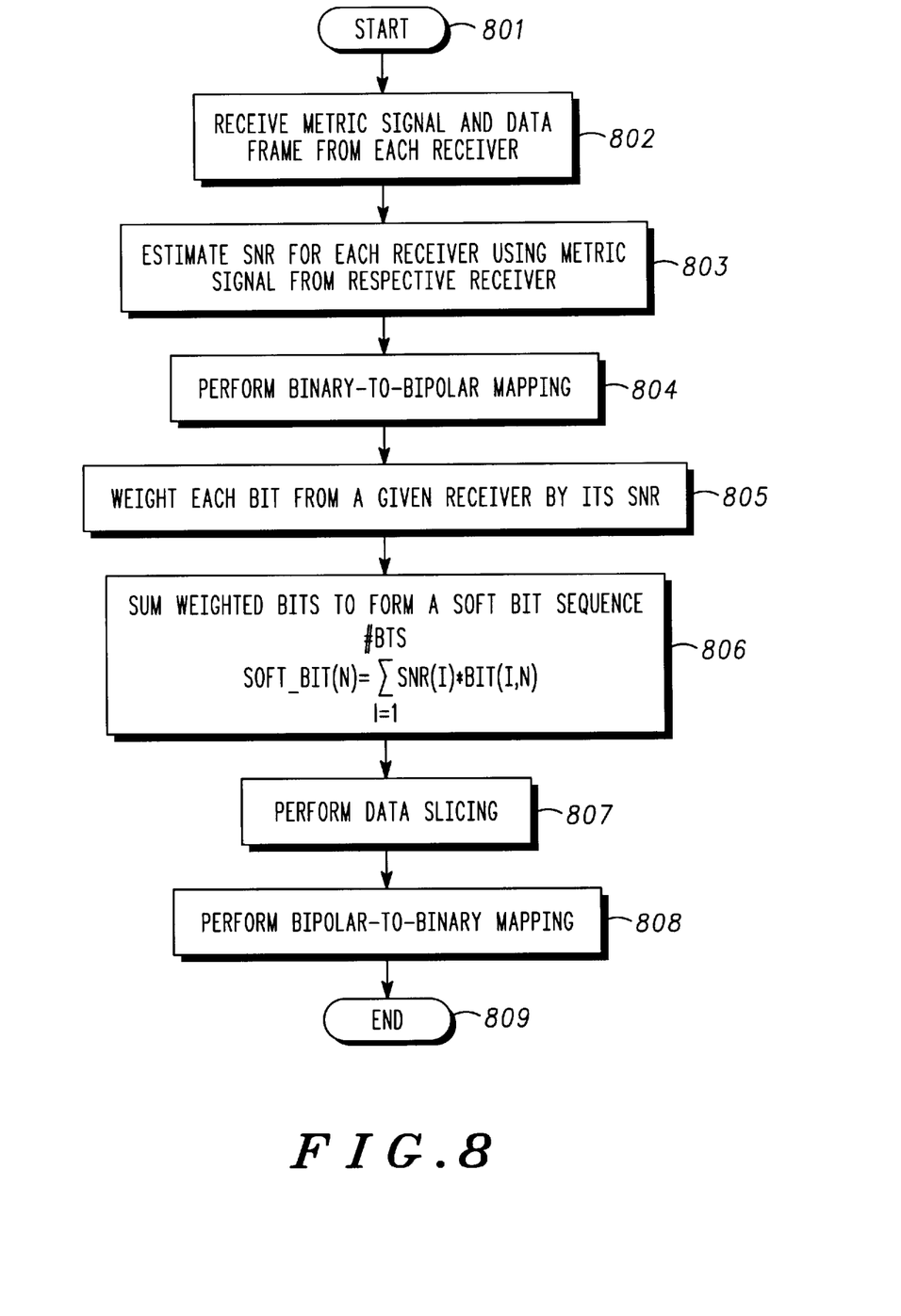
FIG. 8 is a flow diagram illustrating a method for determining a received datum from a plurality of data from a plurality of independent receivers according to an embodiment of the invention.

FIG. 8 is a flow diagram illustrating a method for determining a received datum from a plurality of data from a plurality of independent receivers according to an embodiment of the invention. The process begins in step 801. In step 802, the process receives a metric signal and a datum from each receiver. In step 803, the process estimates the SNR for each receiver using the metric signal from each respective receiver. The process includes a step of determining a first signal-to-noise ratio value based on a first metric signal received from a first receiver of the plurality of independent receivers. The process also includes a step of determining a second signal-to-noise ratio value based on a second metric signal received from a second receiver of the plurality of independent receivers. The process further includes a step of determining a third signal-to-noise ratio value based on a third metric signal received from a third receiver of the plurality of independent receivers.

In step 804, the process maps a first datum and a second datum according to a first mapping function, which may be, for example, a binary-to-bipolar mapping function. In step 805, the process applies a weighting to each datum from a given receiver according to its SNR. After the first signal-to-noise ratio is determined, the process performs the step of multiplying the first signal-to-noise ratio value by a first datum received from the first receiver to provide a first weighted value. After the second signal-to-noise ratio is determined, the process performs the step of multiplying the second signal-to-noise ratio value by a second datum received from the second receiver to provide a second weighted value. After the third signal-to-noise ratio is determined, the process performs the step of multiplying the third signal-to-noise ratio value by a third datum received from the third receiver to provide a third weighted value.

The invention may be practiced using a lookup table to determine the signal-to-noise ratio values based on the metric signals. For example, the step of determining a first signal-to-noise ratio value based on the first metric signal may include the step of consulting a lookup table.

In step 806, the process combines the first weighted value, the second weighted value, and the third weighted value to provide a combined weighted value and determines the received datum based on the combined weighted value. In step 807, the process performs data slicing to obtain a received datum. In step 808, the process maps the received datum according to a second mapping function to yield a final received datum. The second mapping function may be the inverse of the first mapping function. For example, if the first mapping function is a binary-to-bipolar mapping function, the second mapping function would be a bipolar-to-binary mapping function. In step 809, the process ends.

While each independent receiver makes a determination as to what the most likely sequence of data is and transmits "hard decision" data to the base station controller. By weighting the "hard decision" data from each independent receiver by a signal-to-noise ratio value associated with that "hard decision" data on a bit-by-bit basis, an embodiment of the invention synthesizes a form of the data that has properties similar to "soft decision" data. By combining this weighted form of the "hard decision" data and applying it to a data slicer, a more accurate estimate of the data is provided.

Alternatively, if sufficient bandwidth is available between the independent receivers and the base station controller, actual "soft decision" data may be transmitted from the independent receivers to the base station controller. The "soft decision" data is then weighted according to the metric signal to provide weighted values, and the weighted values are combined and applied to the data slicer to yield "hard decision" data with a high likelihood of being an accurate estimate of the data. The "soft decision" data may be any form of data that provides higher than actual resolution of the data. For example, one way to provide "soft decision" data is to use an 8-bit analog-to-digital converter to provide an 8-bit sample to describe a single data bit. This 8-bit sample could be combined with other 8-bit samples from other independent receivers and applied to the data slicer to yield a single data bit.

Figure 9:
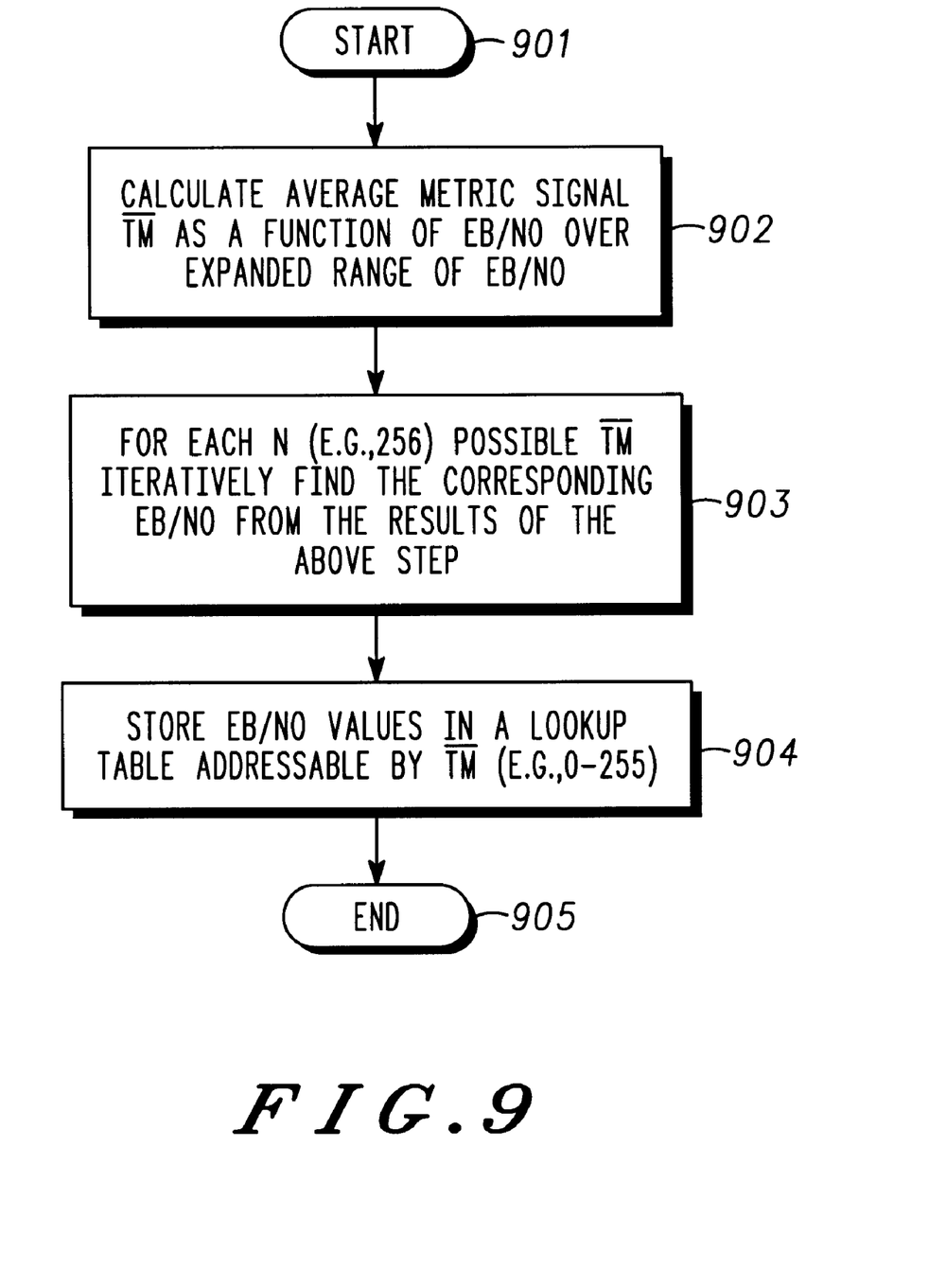
FIG. 9 is a flow diagram illustrating a method for providing a lookup table memory device for providing a signal-to-noise ratio value based on a metric signal according to an embodiment of the invention.

FIG. 9 is a flow diagram illustrating a method for providing a lookup table memory device for providing a signal-to-noise ratio value based on a metric signal according to an embodiment of the invention. The process begins in step 901. In step 902, the process includes applying an average metric relationship to a plurality of possible signal-to-noise ratio values to yield a plurality of average metric values. In step 903, for a first average metric value of the plurality of average metric values, the process determines a first signal-to-noise ratio value corresponding to the first average metric value from the plurality of possible signal-to-noise ratio values. The step of determining the first signal-to-noise ratio value corresponding to the first average metric value may be performed iteratively. This process should be performed at a higher resolution than the desired granularity of the signal-to-noise ratio value. Alternatively, values may be interpolated since, although the curve is nonlinear, it is monotonic.

In step 904, the process stores the first signal-to-noise ratio value corresponding to the first average metric value such that the first signal-to-noise ratio value is addressable by the first average metric value. The first signal-to-noise ratio value is useful to select a first datum from a plurality of data from a plurality of independent receivers. The first signal-to-noise ratio value corresponds to the first datum. The process ends in step 905.

The average metric relationship may be of a form $$\sqrt{E} \sum_{i=0}^{B/R} P[i]\left(\frac{B}{R} - 2i\right),$$

where

E is an energy at a decoder input of a noisefree symbol,
B is a number of encoder input bits,
R is an encoder rate, $$P[i] = \binom{B/R}{i} p^i (1-p)^{B/R-i}$$

p is a channel bit error probability,
$E_b$ is an energy per bit, and
$N_0$ is a noise spectral density.

For every possible value of $E_b/N_0$, the average metric $\overline{TM}$ is calculated, taking into account the number of bits/frame, the encoder rate, and the type of modulation. Then, for every value of the metric signal that can be expected, the corresponding value of $E_b/N_0$ is found, and a lookup table or polynomial estimate is constructed. In one embodiment of the invention, a threshold is set such that if $E_b/N_0$ is less than the threshold, the data corresponding to that $E_b/N_0$ is not combined with the data from other receivers, for example by adder 413 of FIG. 4.

Thus, a method and apparatus for efficiently and reliably combining data from multiple independent receivers has been provided.

What is claimed is:

1. A method for determining a received datum from a plurality of data from a plurality of independent receivers comprising the steps of:
    determining a first signal-to-noise ratio value based on a first metric signal received from a first receiver of the plurality of independent receivers;
    determining a second signal-to-noise ratio value based on a second metric signal received from a second receiver of the plurality of independent receivers;
    multiplying the first signal-to-noise ratio value by a first datum received from the first receiver to provide a first weighted value;
    multiplying the second signal-to-noise ratio value by a second datum received from the second receiver to provide a second weighted value;
    combining the first weighted value and the second weighted value to provide a combined weighted value;
    determining the received datum based on the combined weighted value;
    mapping the first datum according to a first mapping functions;
    mapping the second datum according to the first mapping functions; and
    mapping the received datum according to a second mapping function, wherein the second mapping function is an inverse of the first mapping function.

2. The method of claim 1 further comprising the steps of:
    determining a third signal-to-noise ratio value based on a third metric signal received from a third receiver of the plurality of independent receivers; and
    multiplying the third signal-to-noise ratio value by a third datum received from the third receiver to provide a third weighted value.

3. The method of claim 2 wherein the step of combining the first weighted value and the second weighted value to provide the combined weighted value further comprises the step of:
    combining the first weighted value, the second weighted value, and the third weighted value to provide a combined weighted value.

4. A system for determining a received datum from a plurality of data from a plurality of independent receivers, the system comprising:
    a first signal-to-noise ratio value determination subsystem operatively coupled to a first receiver of the plurality of independent receivers to determine a first signal-to-noise ratio value based on a first metric signal received from the first receiver;
    a first multiplier operatively coupled to the first signal-to-noise ratio value determination subsystem to multiply the first signal-to-noise ratio value by a first representation of a first datum to provide a first weighted value, the first datum provided by the first receiver;
    a second signal-to-noise ratio value determination subsystem operatively coupled to a second receiver of the plurality of independent receivers to determine a second signal-to-noise ratio value based on a second metric signal received from the second receiver;
    a second multiplier operatively coupled to the second signal-to-noise ratio value determination subsystem to multiply the second signal-to-noise ratio value by a second representation of a second datum to provide a second weighted value, the second datum provided by the second receiver;
    an adder operatively coupled to the first multiplier and the second multiplier to combine the first weighted value and the second weighted value to provide a combined weighted value
    a first mapping subsystem operatively coupled to the first receiver to map the first datum to provide the first representation of the fist datum; and
    a second mapping subsystem operatively coupled to the second receiver to map the second datum to provide the second representation of the second datum.

5. The system of claim 4 further comprising:
    a third signal-to-noise ratio value determination subsystem operatively coupled to a third receiver of the plurality of independent receivers to determine a third signal-to-noise ratio value;
    a third multiplier operatively coupled to the third signal-to-noise ratio value determination subsystem to multiply the third signal-to-noise ratio value by a third representation of a third datum to provide a third weighted value, the third datum provided by the third receiver, wherein the adder is operatively coupled to the first multiplier, the second multiplier, and the third multiplier to combine the first weighted value, the second weighted value, and the third weighted value to provide the combined weighted value; and a third mapping subsystem operatively coupled to the third receiver to map the third datum to provide the third representation of the third datum.

6. The system of claim 5 further comprising:

a data slicer operatively coupled to the adder to determine the received datum based on the combined weighted value; and a fourth mapping subsystem coupled to the data slicer to map the received datum to provide a final received datum.

7. The system of claim 6 wherein the first mapping subsystem, the second mapping subsystem, and the third mapping subsystem are binary-to-bipolar mapping subsystems, and the fourth mapping subsystem is a bipolar-to-binary mapping subsystem.

8. The system of claim 4 wherein the first signal-to-noise value determination subsystem comprises:

a relationship memory device;

a processor operatively coupled to the relationship memory device to receive an average metric relationship stored in the relationship memory device; and a metric signal to signal-to-noise-ratio value converter operatively coupled to the first receiver to receive a first metric signal and to the processor, the processor to provide to the metric signal to signal-to-noise ratio value converter the first signal-to-noise ratio value corresponding to a first average metric value.

9. The system of claim 8 wherein the metric signal to signal-to-noise ratio value converter stores the first signal-to-noise ratio value addressable by the first average metric value.

10. A method for providing a lookup table memory device for providing a signal-to-noise ratio value based on a metric signal comprising the steps of:

applying an average metric relationship to a plurality of possible signal-to-noise ratio values to yield a plurality of average metric values;

for a first average metric value of the plurality of average metric values, determining a first signal-to-noise ratio value corresponding to the first average metric value from the plurality of possible signal-to-noise ratio values; and storing the first signal-to-noise ratio value corresponding to the first average metric value such that the first signal-to-noise ratio value is addressable by the first average metric value, the first signal-to-noise ratio value to select a first datum from a plurality of data from a plurality of independent receivers, the first signal-to-noise ratio value corresponding to the first datum.

11. The method of claim 10 wherein the step of determining the first signal-to-noise ratio value corresponding to the first average metric value is performed iteratively.

12. The method of claim 11 wherein the average metric relationship is of a form $$E[M_{\max}] = (1 - P_e)E[M_0 \mid path_0] + \sum_i P[path_d]E[M_0 \mid d]$$

$$= \frac{B}{R}\sqrt{E}(1 - P_e) + \sum_d \left(\frac{B}{R} - 2d\right)\sqrt{E}\, P[path_d];$$

where

E is an energy at a decoder input of a noisefree symbol,

B is a number of encoder input bits,

R is an encoder rate, $$P_d = \sum_{d \neq 0} n_d Q\left[\sqrt{2\gamma_b R d}\,\right]$$

$$P[path_d] = n_d Q\left[\sqrt{2\gamma_b R d}\,\right]$$

$n_d$ is a given weight code distribution, d is a weight, $$\gamma_b = \frac{E_b}{N_0},$$

$$Q(t) = \frac{1}{\sqrt{2\pi}} \int^{\infty} e^{\frac{-y^2}{2}} dy,$$

$E_b$ is an energy per bit, and $N_0$ is a noise spectral density.

13. An apparatus for converting a first metric signal to a first signal-to-noise ratio value, the first signal-to-noise ratio value to select a first datum from a plurality of data from a plurality of independent receivers, the first signal-to-noise ratio value corresponding to the first datum, the apparatus comprising:

a relationship memory device;

a processor operatively coupled to the relationship memory device to receive an average metric relationship stored In the relationship memory device; and a metric signal to signal-to-noise-ratio value converter operatively coupled to a first receiver of the plurality of independent receivers to receive a first metric signal and to the processor, the processor to provide to the metric signal to signal-to-noise ratio value converter the first signal-to-noise ratio value corresponding to a first average metric value.

14. The system of claim 13 wherein the metric signal to signal-to-noise ratio value converter stores the first signal-to-noise ratio value addressable by the first average metric value.

15. The method of claim 13 wherein the average metric relationship is of a form $$E[M_{\max}] = (1 - P_e)E[M_0 \mid path_0] + \sum_i P[path_d]E[M_0 \mid d]$$

$$= \frac{B}{R}\sqrt{E}(1 - P_e) + \sum_d \left(\frac{B}{R} - 2d\right)\sqrt{E}\, P[path_d],$$

where

E is an energy at a decoder input of a noisefree symbol,

B is a number of encoder input bits,

R is an encoder rate, $$P_e = \sum_{d=0} n_d Q\left[\sqrt{2\gamma_b R d}\,\right]$$

$$P[path_d] = n_d Q[\sqrt{2\gamma_b R d}]$$

$n_d$ is a given weight code distribution,
d is a weight, $$\gamma_b = \frac{E_b}{N_0},$$

$$Q(t) = \frac{1}{\sqrt{2\pi}} \int_t^\infty e^{\frac{-y^2}{2}} dy,$$

$E_b$ is an energy per bit, and
$N_0$ is a noise spectral density.

16. A method for a soft handoff between a first base station and a second base station of a mobile unit transmitting a transmitted signal comprising the steps of:
while the mobile unit is within an area of coverage of the first base station, receiving the transmitted signal at a first receiver of the first base station;
while the mobile unit is in a soft handoff region, searching for the transmitted signal at a second receiver of the second base station;
determining a first signal-to-noise ratio value based on a first metric signal obtained from the first receiver of the first base station;
determining a second signal-to-noise ratio value based on a second metric signal obtained from the second receiver of the second base station;
multiplying the first signal-to-noise ratio value by a first datum obtained from the first receiver to provide a first weighted value;
multiplying the second signal-to-noise ratio value by a second datum obtained from the second receiver to provide a second weighted value;
combining the first weighted value and the second weighted value to provide a combined weighted value;
determining the received datum based on the combined weighted value;
mapping the first datum according to a first mapping function;
mapping the second datum according to the first mapping functions; and
mapping the received datum according to a second mapping function, wherein the second mapping function is an inverse of the first mapping function.

17. A system for determining a received datum from a plurality of data from a Plurality of independent receivers, the plurality of data obtained from a transmitted signal transmitted by a mobile unit during a soft handoff, the system comprising:
a first signal-to-noise ratio value determination subsystem operatively coupled to a first receiver of the plurality of independent receivers to determine a first signal-to-noise ratio value based an a first metric signal received from the first receiver,
a first multiplier operatively coupled to the first signal-to-noise ratio value determination subsystem to multiply the first signal-to-noise ratio value by a first representation of a first datum to provide a first weighted value, the first datum provided by the first receiver;
a second signal-to-noise ratio value determination subsystem operatively coupled to a second receiver of the plurality of independent receivers to determine a second signal-to-noise ratio value based on a second metric signal received from the second receiver;
a second multiplier operatively coupled to the second signal-to-noise ratio value determination subsystem to multiply the second signal-to-noise ratio value by a second representation of a second datum to provide a second weighted value, the second datum provided by the second receiver;
an adder operatively coupled to the first multiplier and the second multiplier to combine the first weighted value and the second weighted value to provide a combined weighted value
a first mapping subsystem operatively coupled to the first receiver to map the first datum to provide the first representation of the first datum; and
a second mapping subsystem operatively coupled to the second receiver to map the second datum to provide the second representation of the second datum.

18. The system of claim 17 further comprising:
a third signal-to-noise ratio value determination subsystem operatively coupled to a third receiver of the plurality of independent receivers to determine a third signal-to-noise ratio value;
a third multiplier operatively coupled to the third signal-to-noise ratio value determination subsystem to multiply the third signal-to-noise ratio value by a third representation of a third datum to provide a third weighted value, the third datum provided by the third receiver, wherein the adder is operatively coupled to the first multiplier, the second multiplier, and the third multiplier to combine the first weighted value, the second weighted value, and the third weighted value to provide the combined weighted value; and
a third mapping subsystem operatively coupled to the third receiver to map the third datum to provide the third representation of the third datum.

19. The system of claim 18 further comprising:
a data slicer operatively coupled to the adder to determine the received datum based on the combined weighted value; and
a fourth mapping subsystem coupled to the data slicer to map the received datum to provide a final received datum.

20. The system of claim 19 wherein the first mapping subsystem, the second mapping subsystem, and the third mapping subsystem are binary-to-bipolar mapping subsystems, and the fourth mapping subsystem is a bipolar-to-binary mapping subsystem.

21. The system of claim 17 wherein the first signal-to-noise value determination subsystem comprises:
a relationship memory device;
a processor operatively coupled to the relationship memory device to receive an average metric relationship stored in the relationship memory device; and
a metric signal to signal-to-noise-ratio value converter operatively coupled to the first receiver to receive a first metric signal and to the processor, the processor to provide to the metric signal to signal-to-noise ratio value converter the first signal-to-noise ratio value corresponding to a first average metric value.

22. The system of claim 21 wherein the metric signal to signal-to-noise ratio value converter stores the first signal-to-noise ratio value addressable by the first average metric value.

* * * * *